United States Patent
Gaal et al.

(10) Patent No.: US 8,583,160 B2
(45) Date of Patent: Nov. 12, 2013

(54) UPLINK POWER CONTROL FOR WIRELESS COMMUNICATION

(75) Inventors: Peter Gaal, San Diego, CA (US); Jelena M. Damnjanovic, Del Mar, CA (US); Wanshi Chen, San Diego, CA (US); Naga Bhushan, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 454 days.

(21) Appl. No.: 12/764,513

(22) Filed: Apr. 21, 2010

(65) Prior Publication Data

US 2011/0105059 A1 May 5, 2011

Related U.S. Application Data

(60) Provisional application No. 61/175,407, filed on May 4, 2009.

(51) Int. Cl.
*H04B 7/00* (2006.01)

(52) U.S. Cl.
USPC ........ 455/522; 455/41.1; 455/41.2; 455/41.3; 455/69; 455/70; 370/315; 370/316; 370/317; 370/318; 370/319

(58) Field of Classification Search
USPC .......................... 455/522, 69–70, 67.11, 63.1, 455/41.1–41.3; 370/315–320
See application file for complete search history.

(56) References Cited

U.S. PATENT DOCUMENTS

| | | | |
|---|---|---|---|
| 7,072,413 B2 | 7/2006 | Walton et al. | |
| 8,060,126 B2 * | 11/2011 | Han et al. | 455/522 |
| 2006/0013182 A1 | 1/2006 | Balasubramanian et al. | |
| 2006/0034382 A1 | 2/2006 | Ozluturk et al. | |
| 2006/0291582 A1 | 12/2006 | Walton et al. | |
| 2008/0182611 A1 * | 7/2008 | Han et al. | 455/522 |

FOREIGN PATENT DOCUMENTS

| | | |
|---|---|---|
| JP | 2004254285 A | 9/2004 |
| JP | 2005217935 A | 8/2005 |
| JP | 2008510376 A | 4/2008 |
| KR | 100842620 B1 | 6/2008 |
| WO | WO2004056009 A1 | 7/2004 |
| WO | 2006020434 A2 | 2/2006 |

OTHER PUBLICATIONS

International Search Report and Written Opinion—PCT/US2010/033625, International Search Authority—European Patent Office—Mar. 1, 2011.

(Continued)

*Primary Examiner* — Fayyaz Alam

(57) ABSTRACT

Certain aspects of the present disclosure provide closed loop and open loop power control techniques for each antenna of the user equipment (UE). The access point may measure the received signals from each antenna of the user equipment, calculate a power adjustment parameter for each antenna of the UE, and transmit the parameters to the UE. The UE may use the adjustment parameters to determine the transmit power value for each antenna. In addition, the UE may measure the path loss for each antenna and update the transmit power per antenna based on the path loss and other parameters.

21 Claims, 5 Drawing Sheets

(56) References Cited

OTHER PUBLICATIONS

Motorola, "Multi-Antenna Uplink Transmission for LTE-A", 3GPP Draft, R1-084403 Multi-Antenna UL Transmission (Motorola), 3rd Generation Partnership Project (3GPP), Mobile Competence Centre, 650, Route Des Lucioles, F-06921 Sophia-Antipolis Cedex, France, no. Prague, Czech Republic, Nov. 5, 2008, XP050317665.

Qualcomm Europe, "Calibration Procedures for TDD Beamforming", 3GPP Draft, R1-080494, 3rd Generation Partnership Project (3GPP), Mobile Competence Centre, 650, Route Des Lucioles, F-06921 Sophia-Antipolis Cedex, France, vol. RAN WGI, no. Sevilla, Spain, Jan. 9, 2008, XP050109010.

Samsung, "UL Transmission Power Control, in LTE-A", 3GPP Draft, RI-091250 LTE-A TPC, 3rd Generation Partnership Project (3GPP), Mobile Competence Centre, 650, Route Des Lucioles, F-06921 Sophia-Antipolis Cedex, France, no. Seoul, Korea, Mar. 18, 2009, XP050338862.

Wang Y, et al., "Power optimization for maximum channel capacity in MIMO relay system", Journal of China Universities of Posts and Telecommunications, XX, CN LNKDDOI, 10.1016/S1005-8885(07)60141-1, vol. 14, No. 3, Sep. 1, 2007, pp. 10-15, XP022938017.

Taiwan Search Report—TW099114088—TIPO—Mar. 11, 2013.

\* cited by examiner

| Antenna Number | Power Adjustment Parameter δ |
|---|---|
| 1 | 0.1 |
| 2 | 1 |
| ⋮ | ⋮ |
| $N_T$ | 0.5 |

| Antenna Number | Power Adjustment Parameter $\delta$ |
|---|---|
| 1 | 1 |
| 2 | 0 |
| ⋮ | ⋮ |

UPLINK POWER CONTROL FOR WIRELESS COMMUNICATION

CLAIM OF PRIORITY UNDER 35 U.S.C. §119

This application claims benefit of U.S. Provisional Patent Application Ser. No. 61/175,407 filed May 4, 2009, and assigned to the assignee hereof and hereby expressly incorporated by reference herein.

TECHNICAL FIELD

The following relates generally to wireless communication, and more specifically to establishing antenna-specific uplink power control for multi-antenna wireless devices.

BACKGROUND

Wireless communication systems are widely deployed to provide various types of communication content, such as voice and data. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. These communication links may be established via a single-input-single-output, multiple-input-single-output or a multiple-input-multiple-output (MIMO) system.

Wireless standards may contain power control techniques to control and limit the transmission power utilized by each user equipment (UE) for uplink transmission. For example, the power control technique defined in the LTE standard generates a single, common power value for each user equipment that may be used for all the antennas of the UE. However, different antennas of the UE may experience different fading environments at different points in time.

SUMMARY

Certain aspects of the present disclosure provide a method for wireless communications. The method generally includes receiving power adjustment parameters for a subset of antennas, calculating values of transmit power for the subset of antennas using the received power adjustment parameter associated with each of the antennas, and transmitting signals from the subset of antennas using power equal to the calculated value of transmit power.

Certain aspects of the present disclosure provide a method for wireless communications. The method generally includes transmitting power headroom information about a subset of antennas used for transmission including individual power headroom information for a plurality of transmit antennas, wherein the power headroom information comprises a difference between a current transmit power of each antenna and a maximum transmit power.

Certain aspects of the present disclosure provide a method for wireless communications. The method generally includes performing measurements on the signals received from a subset of antennas of an apparatus, calculating a plurality of power adjustment parameters, one for each antenna in the subset of antennas of the apparatus based on the measurements, and transmitting the power adjustment parameters for the subset of the antennas of the apparatus to calibrate the corresponding antenna(s) of the apparatus.

Certain aspects of the present disclosure provide an apparatus for wireless communications. The apparatus generally includes logic for receiving power adjustment parameters for a subset of antennas, logic for calculating values of transmit power for the subset of antennas using the received power adjustment parameter associated with each of the antennas, and logic for transmitting signals from the subset of antennas using power equal to the calculated value of transmit power.

Certain aspects of the present disclosure provide an apparatus for wireless communications. The apparatus generally includes logic for transmitting power headroom information about a subset of antennas used for transmission including individual power headroom information for a plurality of transmit antennas, wherein the power headroom information comprises a difference between a current transmit power of each antenna and a maximum transmit power.

Certain aspects of the present disclosure provide an apparatus for wireless communications. The apparatus generally includes logic for performing measurements on the signals received from a subset of antennas of an apparatus, logic for calculating a plurality of power adjustment parameters, one for each antenna in the subset of antennas of the apparatus based on the measurements, and logic for transmitting the power adjustment parameters for the subset of the antennas of the apparatus to calibrate the corresponding antenna(s) of the apparatus.

Certain aspects of the present disclosure provide an apparatus for wireless communications. The apparatus generally includes means for receiving power adjustment parameters for a subset of antennas, means for calculating values of transmit power for the subset of antennas using the received power adjustment parameter associated with each of the antennas, and means for transmitting signals from the subset of antennas using power equal to the calculated value of transmit power.

Certain aspects of the present disclosure provide an apparatus for wireless communications. The apparatus generally includes means for transmitting power headroom information about a subset of antennas used for transmission including individual power headroom information for a plurality of transmit antennas, wherein the power headroom information comprises a difference between a current transmit power of each antenna and a maximum transmit power.

Certain aspects of the present disclosure provide an apparatus for wireless communications. The apparatus generally includes means for performing measurements on the signals received from a subset of antennas of an apparatus, means for calculating a plurality of power adjustment parameters, one for each antenna in the subset of antennas of the apparatus based on the measurements, and means for transmitting the power adjustment parameters for the subset of the antennas of the apparatus to calibrate the corresponding antenna(s) of the apparatus.

Certain aspects provide a computer-program product for wireless communications, comprising a computer-readable medium having instructions stored thereon, the instructions being executable by one or more processors. The instructions generally include instructions for receiving power adjustment parameters for a subset of antennas, instructions for calculating values of transmit power for the subset of antennas using the received power adjustment parameter associated with each of the antennas, and instructions for transmitting signals from the subset of antennas using power equal to the calculated value of transmit power.

Certain aspects provide a computer-program product for wireless communications, comprising a computer-readable medium having instructions stored thereon, the instructions being executable by one or more processors. The instructions generally include instructions for transmitting power headroom information about a subset of antennas used for transmission including individual power headroom information for a plurality of transmit antennas, wherein the power headroom information comprises a difference between a current transmit power of each antenna and a maximum transmit power.

Certain aspects provide a computer-program product for wireless communications, comprising a computer-readable medium having instructions stored thereon, the instructions being executable by one or more processors. The instructions generally include instructions for performing measurements on the signals received from a subset of antennas of an apparatus, instructions for calculating a plurality of power adjustment parameters, one for each antenna in the subset of antennas of the apparatus based on the measurements, and instructions for transmitting the power adjustment parameters for the subset of the antennas of the apparatus to calibrate the corresponding antenna(s) of the apparatus.

Certain aspects of the present disclosure provide an apparatus for wireless communications. The apparatus generally includes at least one processor configured to receive power adjustment parameters for a subset of antennas, calculate values of transmit power for the subset of antennas using the received power adjustment parameter associated with each of the antennas, and transmit signals from the subset of antennas using power equal to the calculated value of transmit power.

Certain aspects of the present disclosure provide an apparatus for wireless communications. The apparatus generally includes at least one processor configured to transmit power headroom information about a subset of antennas used for transmission including individual power headroom information for a plurality of transmit antennas, wherein the power headroom information comprises a difference between a current transmit power of each antenna and a maximum transmit power.

Certain aspects of the present disclosure provide an apparatus for wireless communications. The apparatus generally includes at least one processor configured to perform measurements on the signals received from a subset of antennas of an apparatus, calculate a plurality of power adjustment parameters, one for each antenna in the subset of antennas of the apparatus based on the measurements, and transmit the power adjustment parameters for the subset of the antennas of the apparatus to calibrate the corresponding antenna(s) of the apparatus.

BRIEF DESCRIPTION OF THE DRAWINGS

So that the manner in which the above recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
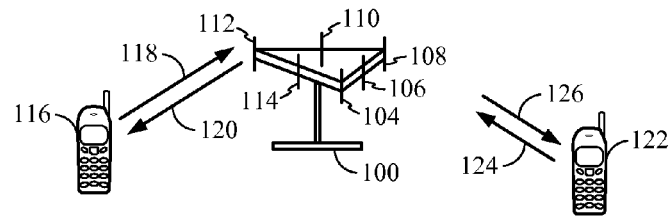
FIG. 1 illustrates a block diagram of an example multiple access wireless communication system, in accordance with certain aspects of the present disclosure.

The techniques described herein can be used for various wireless communication networks, such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), CDMA2000, etc.

UTRA includes Wideband-CDMA (W-CDMA) and Low Chip Rate (LCR). CDMA2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA) is a technique that utilizes single carrier modulation and frequency domain equalization. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. SC-FDMA is currently a working assumption for uplink multiple access scheme in 3GPP Long Term Evolution (LTE), or Evolved UTRA.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Referring to FIG. 1, a multiple access wireless communication system is illustrated, in accordance with certain aspects of the present disclosure. An access point 100 (AP) includes multiple antenna groups, one including 104 and 106, another including 108 and 110, and an additional including 112 and 114. In FIG. 1, only two antennas are shown for each antenna group, however, more or fewer antennas can be utilized for each antenna group. Access terminal 116 (AT) (e.g., a user equipment or UE) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124 and 126 can use different frequencies for communication. For example, forward link 120 can use a different frequency than that used by the reverse link 118.

Each group of antennas and/or the area in which they are designed to communicate is often referred to as a sector of the access point. In one aspect, antenna groups each are designed to communicate to access terminals in a sector of the area covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point can be a fixed station used for communicating with the terminals and can also be referred to as a base station, a Node B, or some other terminology. An access terminal can also be called a mobile station, user equipment (UE), a wireless communication device, terminal, access terminal or some other terminology.

Figure 2:
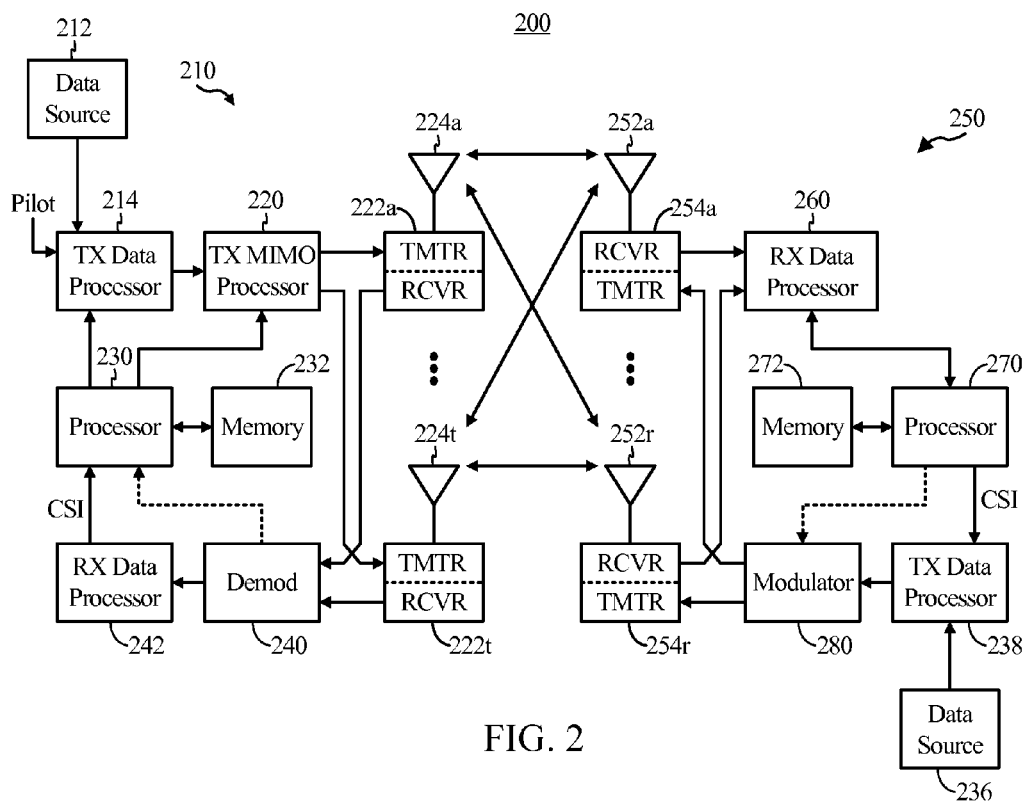
FIG. 2 illustrates a block diagram of an example wireless communication system, in accordance with certain aspects of the present disclosure.

FIG. 2 is a block diagram of an aspect of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., binary phase shift keying (BPSK), quadrature phase shift keying (QPSK), M-PSK, or quadrature amplitude modulation (M-QAM)) selected for that data stream to provide modulation symbols. The data rate, coding, and modulation for each data stream may be determined by instructions performed by processor 230.

The modulation symbols for all data streams are then provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion.

The reverse link message can comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 performs beamforming on the extracted message using a pre-coding matrix.

Example Uplink Power Control for Wireless Communication

In wireless systems, uplink power control techniques are used to control and limit the uplink transmission power utilized by each user equipment (UE). The transmission power or maximum transmission power for each user may be determined based on a plurality of parameters, such as maximum allowed power, the bandwidth of the transmission channel, the downlink path loss and other parameters.

The power control technique defined in the LTE standard generates a single power value for each UE that may be used for all of the antennas of the UE. However, antennas of a UE may be imbalanced due to various conditions that may not be calibrated in advance. For example, there may be an obstacle in front of one of the antennas that blocks the transmission of that antenna. Or, different antennas may experience different fading environments in their respective communication channels. Therefore, the performance of the system may be improved by techniques that perform power control per antenna of the UE.

Figure 3:
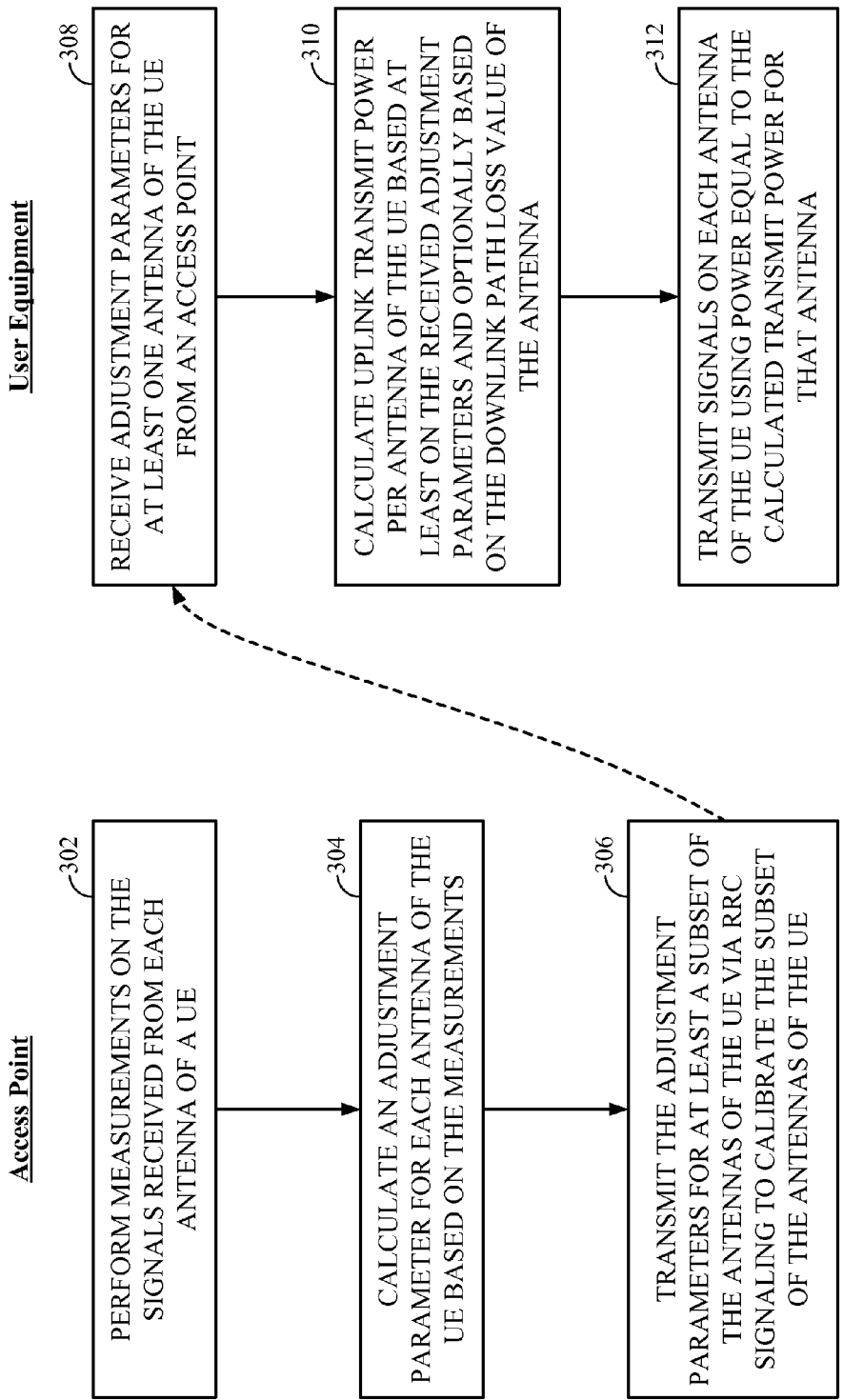
FIG. 3 illustrates example operations for an uplink power control mechanism per antenna of a user equipment, in accordance with certain aspects of the present disclosure.

FIG. 3 illustrates example operations for an uplink power control mechanism for controlling transmission power for at least a subset of antennas of a UE, in accordance with certain aspects of the present disclosure. At 302, an access point performs measurements on the signals received from a subset of antennas of a UE. At 304, the access point calculates adjustment parameters for the subset of antennas of the UE based on the measurements. At 306, the access point transmits the adjustment parameters for the subset of the antennas of the UE by RRC signaling or other means to calibrate those antennas.

At 308, the UE receives adjustment parameters for at least one of its antennas from an access point. At 310, the UE calculates the value of uplink transmit power per antenna of the UE based on the received adjustment parameters and optionally based on the downlink path loss values of the antennas. At 312, the UE transmits signals on each antenna of the UE using a power equal to the calculated transmit power for that antenna.

It should be noted that although the above operations are described from the perspective of an AP and a UE, these operations are not limited to the AP and the UE. Those skilled in the art would appreciate that any two communicating devices may use the proposed methods for power control without diverting from the scope of the current disclosure.

Figure 4A:
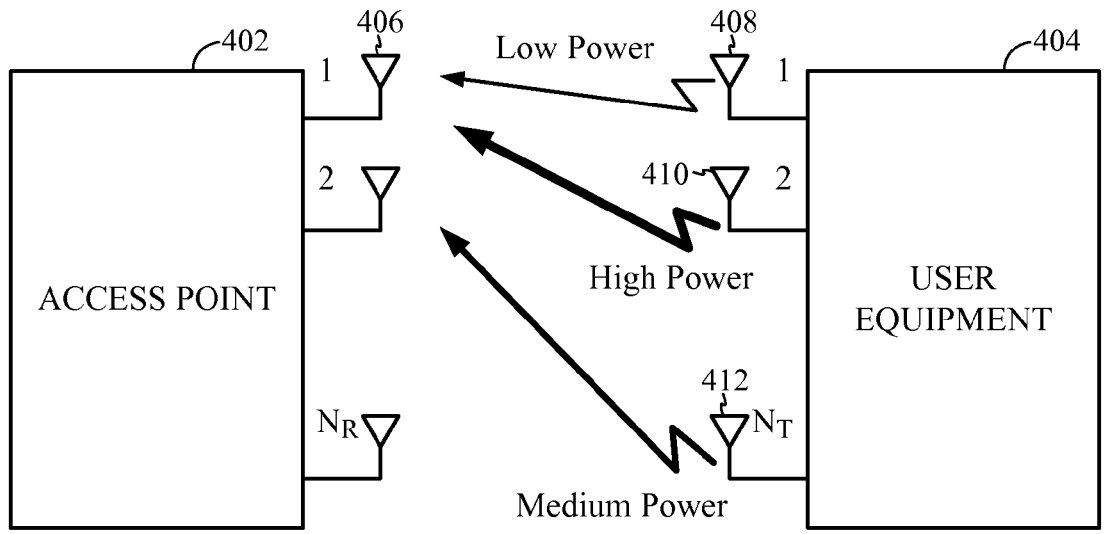
FIGS. 4A and B illustrate example uplink transmissions by a power-controlled user equipment, in accordance with certain aspects of the present disclosure.
Figure 4B:
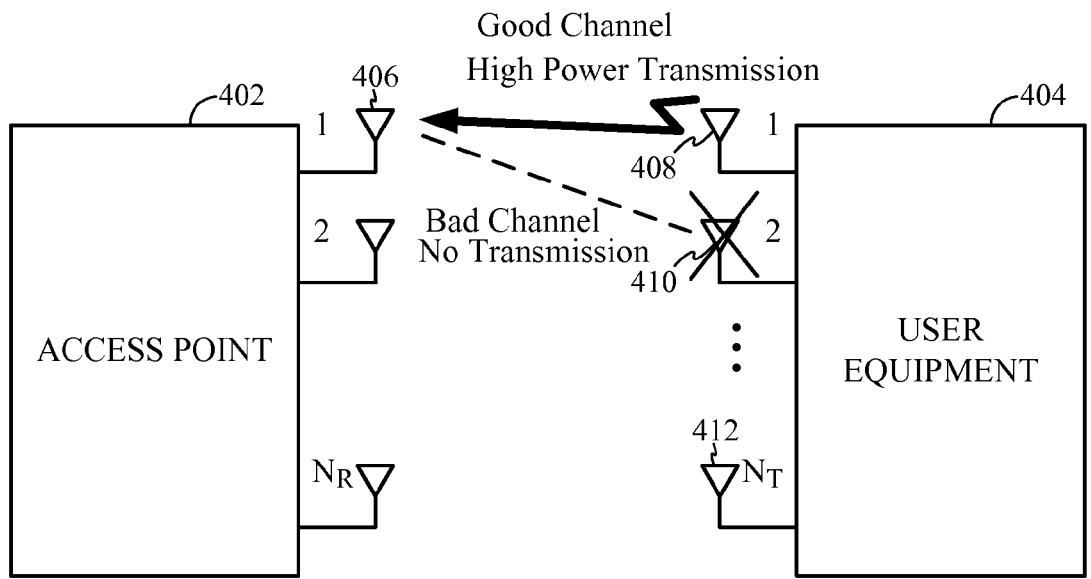

FIGS. 4A and 4B illustrate a non-limiting example in which an access point and a UE employ the proposed power control technique for a subset of antennas of the UE. The access point 402 calculates the power adjustment values for all the antennas of the UE 406, stores them in a table and transmits the power adjustment values to the UE. The UE calculates the transmission power for the first 408, second 410 and $N_T^{th}$ 412 antennas and transmits signals to the AP from the antennas with the corresponding powers.

As illustrated in FIG. 4A, a signal is transmitted from the first antenna 408 with low power depending on the quality of the channel between this antenna and the access point. At the same time, the UE may transmit another signal from its second antenna with high power. Based on the value of the adjustment parameter $\delta_l$ for each antenna (which will be discussed in more detail later), the UE adjusts its transmission power for that antenna.

FIG. 4B illustrates an example in which the communication channel between one of the antennas (i.e., the first antenna) of the UE and the access point is good and the channel seen by another antenna (i.e., the second antenna 410) is very bad. In this example, the second antenna may have been blocked by an object. The UE may decide not to transmit any signal from the second antenna and instead transmit a signal with higher power from the first antenna to convey the information that was supposed to be transmitted by both the first and the second antennas by the first antenna.

Example Uplink Transmit Power Adjustment

Various algorithms may be utilized to perform the power adjustment described above with reference to FIGS. 3 and 4. For example, in release 8 of the LTE standard, the uplink transmit power of a user equipment for transmission in the physical uplink shared channel (PUSCH) for a particular subframe (i.e., subframe i) is calculated based on the following equation:

$$P_{PUSCH}(i) = \min\{P_{max}, 10 \log_{10}(M_{PUSCH}(i)) + P_{O\_PUSCH}(j) + \alpha(j) \cdot PL + \Delta_{TF}(i) + f(i)\} \quad \text{Eqn (1)}$$

where $P_{max}$ represents the maximum allowed power for transmission form the UE, $M_{PUSCH}$ represents the bandwidth of PUSCH resource assignment, which is expressed by the number of resource blocks valid for the subframe i. $P_{O\_PUSCH}(j)$ is a parameter comprising sum of two parameters, including $P_{O\_NOMINAL\_PUSCH}(j)$ which represents the nominal power in each communication cell, and $P_{O\_UE\_PUSCH}(j)$ which is a UE-specific parameter, j=0 or 1 in which j represents the channel allocation type.

The parameter $\alpha$ in Eqn (1) is a 3-bit value specific to each communication cell that can take one of the values $\alpha(j) \in \{0, 0.4, 0.5, 0.6, 0.7, 0.8, 0.9, 1\}$ for j=0 or 1. PL is an estimate of downlink path loss calculated by the UE in units of dB. The downlink path loss estimate PL may be calculated through following equation:

$$PL = P_{rs} - P_{frs}$$

where $P_{rs}$ represents the transmitted power of the reference signal, and $P_{frs}$ represents the received power of the reference signal. $\Delta_{TF}(i) = 10 \log_{10}(2^{M \cdot K_s} - 1)$, where $K_s$ is a correction factor, $M = S_{TB}/N_{RE}$, where $S_{TB}$ is transport block size and $N_{RE}$ is number of resource elements. In addition, the function $f(i)$ provides the current state of the power control adjustment for PUSCH channel. It should be noted that the values of some of the parameters in Eqn (1), such as $P_{max}$, $P_{O\_PUSCH}$, $P_{rs}$, are provided to the UE by higher communication layers.

Certain aspects of the present disclosure provide techniques for controlling transmission power per antenna of a UE. In the proposed closed-loop power control technique, the access point receives a plurality of signals from a plurality of antennas of the UE and performs measurements on the received signals. For example, the access point may measure the sounding reference signal (SRS) per antenna of the UE. Or, in a MIMO system with transmit diversity, the access point may perform measurements on the signals received in either physical uplink control channel (PUCCH) or physical uplink shared channel (PUSCH), such as demodulation reference signal (DMRS) or other signals.

The access point may define an adjustment parameter $\delta_l$ for each antenna (i.e., antenna l, l=1, ..., $N_T$) of the UE based on the measurements made on the received signals (refer to FIG. 3, block 304). Each of the adjustment parameters may be represented by a small number of bits since the range of these parameters may be small.

For certain aspects, for a UE with $N_T$ transmit antennas, the access point may define $N_T - 1$ adjustment parameters for relative power adjustment of antennas (i.e., compared to one of the antennas of the UE). In another aspect, the access point may define a common power control parameter for all the antennas and $N_T$ relative adjustment parameters for each antenna. The power control parameter for each antenna may then be the summation of the common power control parameter and the per antenna adjustment parameter. For yet another aspect, the access point may send $N_T$ adjustment parameters, one for each antenna of the UE.

The plurality of adjustment parameters $\delta_l$, $l=1 \ldots N_T$ may be transmitted to the UE semi-statically by radio resource control (RRC) signaling or other means (refer to FIG. 3, block 306). For certain aspects, the rate of update for the power adjustment parameters may be fast or slow depending on the parameters of the system.

The UE may utilize the adjustment parameter for each of its antennas to calculate or adjust the transmit power per antenna for transmission in different channels (refer to FIG. 3, block 310), such as PUSCH, PUCCH, physical random access channel (PRACH), and SRS. For example, the UE may employ a modified version of Eqn (1) to calculate the power value per antenna, as follows:

$$P_{PUSCH}(i,1) = \{P_{max}, 10 \log_{10}(M_{PUSCH}(i)) + P_{0\_PUSCH}(j,\delta_l) + \alpha(j) \cdot PL(1) + \Delta_{TF}(i) + f(i)\} \quad \text{Eqn (2)}$$

in which $l=1, \ldots, N_T$ represents the antenna index. The UE may utilize the adjustment parameter per antenna to calculate the value of $P_{O\_PUSCH}(j,\delta_l)$.

Different antennas of a UE may experience different fading environments at different times. With a closed loop power control, the effect of fading and antenna gain imbalance may be reduced on the fly (i.e., during the operation of the UE).

It should be noted that the closed loop power control per antenna of a user equipment incurs some overhead due to transmission of the adjustment parameters for each antenna of the UE by the access point. However, for certain aspects, the overhead may be reduced by distributing the transmission of the adjustment parameters in time, and transmitting the parameters for a subset of antennas of the UE at each transmission time, and cycling through the antennas for different transmissions. This scheme can be used for slow varying environments in which the rate of update of the adjustment parameters is low.

One of the advantages of the closed loop power control per antenna is eliminating the need for frequent RRC reconfigurations by correcting the antenna imbalance. In addition, the closed loop power control per antenna may provide tighter power control.

For certain aspects of the present disclosure, the access point may utilize the adjustment parameters—used for controlling the transmit power in the UE—to select or update a precoding matrix. In some cases, the access point may even use the adjustment parameters that have been sent to the UE, but not yet utilized by the UE in precoding matrix selection.

Certain aspects of the present disclosure provide techniques for open loop power control per antenna of a UE. In open-loop power control, the UE may receive signals by each of its antennas and calculate the path loss values of the corresponding downlink channels. The UE may then update the power value per antenna based on the path loss values calculated per antenna. For example, the UE may substitute $\alpha \cdot PL_l$ in Eqn (1) instead of $\alpha \cdot PL$, in which $PL_l$ is the path loss per antenna of the UE. The open-loop power control may be used to invert body loss differences between the antennas. Body loss is a term that refers to the blocking of one or more of the antennas of a user equipment by a person's hand or body that results in degradation of the performance of the blocked antenna.

Certain aspects of the present disclosure may combine the closed-loop and open-loop power control techniques to adjust the power per antenna of the UE. By combining the closed loop and open loop power control techniques per antenna, the required rate of updates for the closed loop power control may be reduced.

For certain aspects of the present disclosure, assuming some correlation between the antennas of a UE, the power control equation for each antenna may include two parts, the first part may be common among all the antennas of a UE and the second part may be specific to each antenna of the UE. The common part of the power control may have a larger range. The antenna-specific part of the power control may have a smaller range and may correspond to a different power control granularity compared to the common part of the power control. For certain aspects, the rate of the updates for the common power control and individual power control may be different. It is advantageous from a signaling efficiency perspective if the common and individual (relative) power control command update rates are optimized. For example, the individual power control commands can be sent less frequently than the common power control commands.

For certain aspects, the UE may signal the amount of antenna compensation applied to each of its antennas to the access point. In addition, the UE may transmit some information about the power limitations that the UE is experiencing to the access point. The access point may utilize this information to adjust or update the values of the adjustment parameters per antenna that transmits to the UE in the next time slot. The information about the power limitation may be in the form of Uplink Power Headroom Reports, wherein the UE sends information about the difference between its current transmit power and the maximum transmit power.

The Uplink Power Headroom Report may refer to the total power transmitted by the UE or the power transmitted by a given antenna. It is advantageous in the context of individual antenna power control if the value of per antenna power headroom is available to the access point in order to optimize the power adjustment parameters sent to the UE to be used in the next time slot and the uplink data rate granted to the UE for the next time slot. If reliable signaling method is used to convey the individual power control commands from the access point to the UE, and the maximum power for each individual antenna is known to the access point, then the individual antenna power headroom report by the UE to the access point may not be necessary. On the other hand, using reliable signaling for individual power control updates may be costly in terms of system resources; therefore when the downlink and uplink system capacity are jointly optimized, it may be advantageous to use individual (per antenna) headroom reports by the UE to the access point.

An individual antenna may mean an individual physical transmit antenna or it may mean multiple physical transmit antennas treated as a single virtual antenna. In the latter case, it is assumed that the power ratio between the physical transmit antennas, which are treated as a single virtual antenna for power control purposes, is not adjustable.

For certain aspects, the UE may select antennas for transmission as a function of the antenna gain imbalance in order to extend the life of its battery.

In another aspect, the access point may choose the set of antennas used for transmission considering the antenna gain imbalance to extend the UE battery life.

Figure 3A:
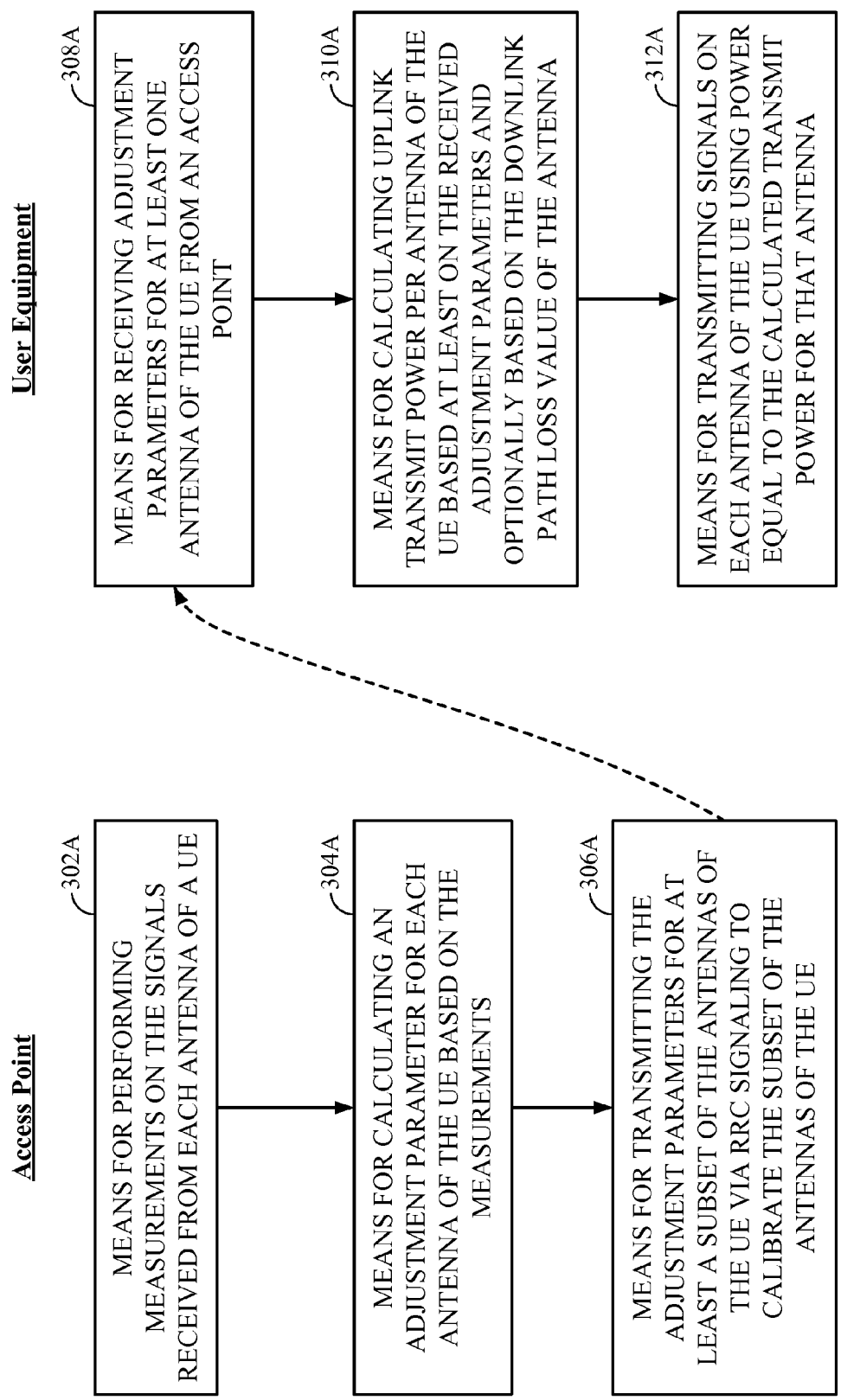
FIG. 3A illustrates example components capable of performing the operations illustrated in FIG. 3.

The various operations of methods described above may be performed by various hardware and/or software component(s) and/or module(s) corresponding to means-plus-function blocks illustrated in the Figures. For example, blocks 302-312 illustrated in FIG. 3 correspond to means-plus-function blocks 302A-312A illustrated in FIG. 3A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present invention, other and further embodiments of the invention may be devised without departing from the basic scope thereof, and the scope thereof is determined by the claims that follow.

The invention claimed is:

1. A method for wireless communications, comprising:
receiving power adjustment parameters for a subset of antennas, wherein the power adjustment parameters comprise a common power adjustment parameter for all of the antennas of the subset of antennas and a relative power adjustment parameter for each of the antennas of the subset of antennas;
calculating values of transmit power for the subset of antennas using the received common power adjustment parameter and the received relative power adjustment parameter associated with each of the antennas; and
transmitting signals from the subset of antennas using power based on the calculated values of transmit power.

2. The method of claim 1, further comprising:
adjusting the calculated values of transmit power for the subset of antennas based on the value of path loss in signals received by each antenna.

3. The method of claim 1, further comprising:
determining the subset of antennas from which to transmit signals based at least on an optimization of power consumption.

4. The method of claim 1, further comprising:
receiving information about the subset of antennas;
calculating values of transmit power for the subset of antennas using the received power adjustment parameters associated with each of the antennas; and
adjusting the subset of antennas from which to transmit signals and the transmit power for the subset of antennas based on the calculated values.

5. The method of claim 1, wherein $N_T$ power adjustment parameters are received for $N_T$ antennas, one for each antenna.

6. The method of claim 1, wherein $N_T-1$ power adjustment parameters are received for $N_T-1$ antennas, relative to one of the antennas that is not included in the $N_T-1$ antennas.

7. The method of claim 1, wherein dynamic range of the common power adjustment parameter is larger than dynamic range of the relative power adjustment parameters.

8. The method of claim 1, wherein rate of update for the common power adjustment parameter and the relative power adjustment parameters are different.

9. The method of claim 1, wherein granularity of the common power adjustment parameter and the relative power adjustment parameters are different.

10. An apparatus for wireless communications, comprising:
   logic for receiving power adjustment parameters for a subset of antennas, wherein the power adjustment parameters comprise a common power adjustment parameter for all of the antennas of the subset of antennas and a relative power adjustment parameter for each of the antennas of the subset of antennas;
   logic for calculating values of transmit power for the subset of antennas using the received common power adjustment parameter and the received relative power adjustment parameter associated with each of the antennas; and
   logic for transmitting signals from the subset of antennas using power based on the calculated values of transmit power.

11. The apparatus of claim 10, further comprising:
   logic for adjusting the calculated values of transmit power for the subset of antennas based on the value of path loss in signals received by each antenna.

12. The apparatus of claim 10, further comprising:
   logic for determining the subset of antennas from which to transmit signals based at least on an optimization of power consumption.

13. The apparatus of claim 10, further comprising:
   logic for receiving information about the subset of antennas;
   logic for calculating values of transmit power for the subset of antennas using the received power adjustment parameters associated with each of the antennas; and
   logic for adjusting the subset of antennas from which to transmit signals and the transmit power for the subset of antennas based on the calculated values.

14. The apparatus of claim 10, wherein $N_T$ power adjustment parameters are received for $N_T$ antennas, one for each antenna.

15. The apparatus of claim 10, wherein $N_T-1$ power adjustment parameters are received for $N_T-1$ antennas, relative to one of the antennas that is not included in the $N_T-1$ antennas.

16. The apparatus of claim 10, wherein dynamic range of the common power adjustment parameter is larger than dynamic range of the relative power adjustment parameters.

17. The apparatus of claim 10, wherein rate of update for the common power adjustment parameter and the relative power adjustment parameters are different.

18. The apparatus of claim 10, wherein granularity of the common power adjustment parameter and the relative power adjustment parameters are different.

19. An apparatus for wireless communications, comprising:
   means for receiving power adjustment parameters for a subset of antennas, wherein the power adjustment parameters comprise a common power adjustment parameter for all of the antennas of the subset of antennas and a relative power adjustment parameter for each of the antennas of the subset of antennas;
   means for calculating values of transmit power for the subset of antennas using the received common power adjustment parameter and the received relative power adjustment parameter associated with each of the antennas; and
   means for transmitting signals from the subset of antennas using power based on the calculated values of transmit power.

20. A computer-program product for wireless communications, comprising a non-transitory computer readable medium having instructions stored thereon, the instructions being executable by one or more processors and the instructions comprising:
   instructions for receiving power adjustment parameters for a subset of antennas, wherein the power adjustment parameters comprise a common power adjustment parameter for all of the antennas of the subset of antennas and a relative power adjustment parameter for each of the antennas of the subset of antennas;
   instructions for calculating values of transmit power for the subset of antennas using the received common power adjustment parameter and the received relative power adjustment parameter associated with each of the antennas; and
   instructions for transmitting signals from the subset of antennas using power based on the calculated values of transmit power.

21. An apparatus for wireless communications, comprising at least one processor configured to:
   receive power adjustment parameters for a subset of antennas, wherein the power adjustment parameters comprise a common power adjustment parameter for all of the antennas of the subset of antennas and a relative power adjustment parameter for each of the antennas of the subset of antennas;
   calculate values of transmit power for the subset of antennas using the received common power adjustment parameter and the received relative power adjustment parameter associated with each of the antennas; and
   transmit signals from the subset of antennas using power based on the calculated values of transmit power.

* * * * *